United States Patent [19]

Brown

[11] Patent Number: 4,930,201
[45] Date of Patent: * Jun. 5, 1990

[54] METHOD FOR MANUFACTURING A COMPOSITE SLEEVE FOR AN ELECTRIC MOTOR

[75] Inventor: Gerald W. Brown, Christiansburg, Va.

[73] Assignee: Kollmorgen Corporation, Simsbury, Conn.

[*] Notice: The portion of the term of this patent subsequent to Mar. 8, 2005 has been disclaimed.

[21] Appl. No.: 258,085

[22] Filed: Oct. 14, 1988

Related U.S. Application Data

[62] Division of Ser. No. 133,730, Dec. 16, 1987, abandoned, which is a division of Ser. No. 765,507, Aug. 14, 1985, Pat. No. 4,729,160.

[51] Int. Cl.$^5$ .............................................. H02K 15/02
[52] U.S. Cl. ......................................... 29/598; 29/447; 310/42; 310/156; 310/271
[58] Field of Search .................... 29/598, 447; 310/42, 310/156, 262, 271

[56] References Cited

U.S. PATENT DOCUMENTS

| | | |
|---|---|---|
| 2,795,715 | 6/1957 | Gilchrist . |
| 3,077,026 | 2/1963 | Blackburn ...................... 310/156 X |
| 3,344,325 | 9/1967 | Sklaroff ......................... 310/156 X |
| 3,858,308 | 1/1975 | Peterson ........................ 310/156 X |
| 3,968,390 | 7/1976 | Yasuda et al. ..................... 310/156 |
| 4,113,518 | 9/1978 | Henderson . |
| 4,150,582 | 4/1979 | Burgmeier et al. . |
| 4,296,544 | 10/1981 | Burgmeier et al. . |
| 4,433,261 | 2/1984 | Nashiki et al. . |
| 4,454,438 | 6/1984 | Yamashita et al. ............ 310/156 X |
| 4,531,071 | 7/1985 | Kintz, Jr. et al. ................... 310/156 |
| 4,549,341 | 10/1985 | Kasabian ........................ 310/156 X |
| 4,564,777 | 1/1986 | Senoo et al. . |
| 4,617,726 | 10/1986 | Denk ............................. 310/156 X |
| 4,633,113 | 12/1986 | Patel ................................ 310/156 |
| 4,729,160 | 3/1988 | Brown ........................... 310/156 X |

Primary Examiner—Carl E. Hall
Attorney, Agent, or Firm—Morgan & Finnegan

[57] ABSTRACT

In an electric motor having a plurality of magnets bonded to a rotor hub, a composite sleeve is disposed over the rotor hub and magnets. The composite sleeve may be wound directly upon the rotor hub, or the composite sleeve may be wound upon a mandrel and slid over the rotor hub.

3 Claims, 2 Drawing Sheets

METHOD FOR MANUFACTURING A COMPOSITE SLEEVE FOR AN ELECTRIC MOTOR This is a Division of application Ser. No. 133,730, filed Dec. 16, 1987, now abandoned, which in turn is a Division of application Ser. No. 765,507, filed Aug. 14, 1985, now U.S. Pat. No. 4,729,160 of Mar. 8, 1988.

Background of the Invention

The present invention relates generally to rotors for DC or PM synchronous electric motors or synchronous alternators (hereafter referred to as generators) and, more specifically to a composite sleeve for such rotors.

A sleeve on a DC or PM synchronous motor/generator rotor serves several purposes. The rotor typically consists of magnets bonded to the outside diameter of a steel rotor hub on which there is a sleeve that prevents magnets from being thrown off the rotor and into the stator due to the centrifugal forces on the magnet caused by the rotation of the rotor. The sleeve also helps to protect the magnets from chipping during assembly.

Typically, such sleeves are hollow, substantially cylindrical, steel members which are interference fit over the magnets and hub. Steel sleeves increase the inertia of the rotor. The conductivity of a steel sleeve also undesirably facilitate the flow of eddy currents inside the motor.

It is an object of the present invention to provide a sleeve for a high performance DC motor rotor having only 20–27% of the inertia of a stainless steel sleeve, thereby increasing the acceleration rate of the rotor, under a given torque.

It is a further object of the present invention to provide low electrical conductivity compared to a stainless steel sleeve, thereby reducing the flow of eddy currents in the sleeve.

SUMMARY OF THE INVENTION

The present invention provides a low inertia rotor for a DC or PM synchrounous electric motor/generator. The rotor includes a steel hub, magnets bonded to the circumference of the hub, and a composite sleeve disposed over the magnets and hub. The coefficient of thermal expansion of the composite sleeve has a predetermined value that is less than the coefficient of thermal expansion of the steel hub. Accordingly, as the rotor heats up the steel hub expands more than the composite sleeve, thereby exerting a compressive force upon the magnets and the adhesives used to bond the magnets to the steel hub. The compressive force holds the magnets in close proximity to hub, and prevents the magnets from being thrown from the hub.

DETAILED DESCRIPTION OF THE INVENTION

Figure 1:
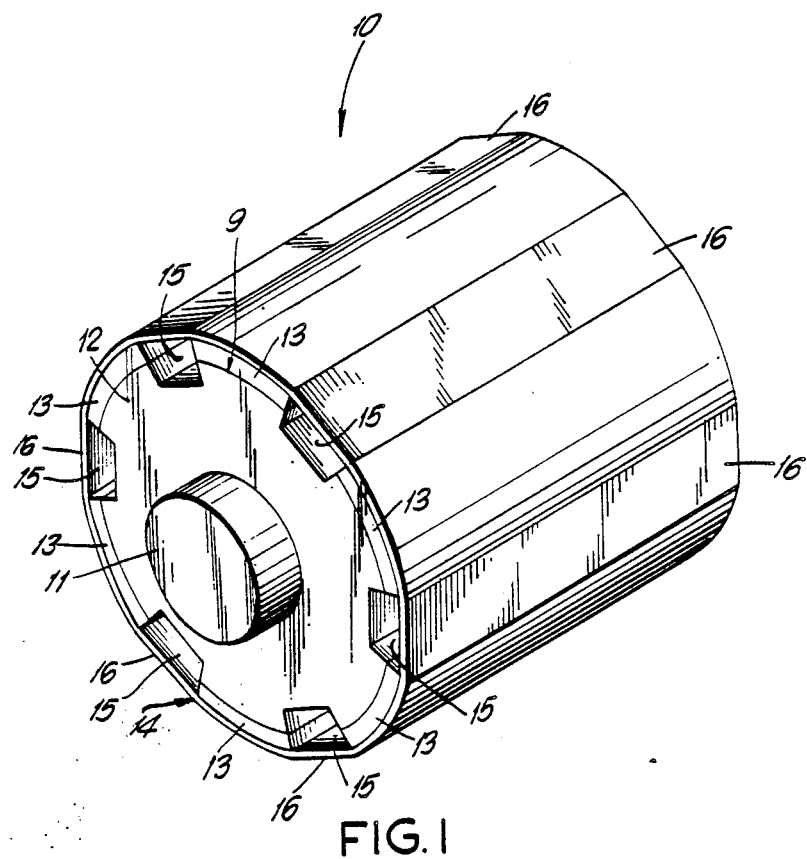
FIG. 1 is a perspective view of a rotor having a composite sleeve.

Referring now to FIG. 1, a perspective view illustrates a rotor 10 for a DC or PM synchronous electric motor/generator. The rotor 10 includes a shaft 11, a steel hub 12, magnets 13 and a composite sleeve 14. There are interpole spaces 15 between the magnets 13. The sleeve 14 is made from an advanced composite material having a coefficient of thermal expansion that is less than the coefficient of thermal expansion for the steel hub 12. The term "advanced composite material" used herein means the high strength, high modulus forms of fibers such as fiberglass graphite, boron, and kevlar used in an epoxy or other plastic matrix.

There is an unusually distinct benefit that can be had from the low coefficient of thermal expansion of the composite material of the sleeve 14. In general, these fibers have lower coefficients of thermal expansion than the steel hub 12 and the magnets 13. During the initial operation of the motor/generator, the temperature of the rotor 10 goes up a few degrees Fahrenheit. Accordingly, there is more thermal expansion for the rotor hub 12, than for the sleeve 14, and this differential in expansion places a compressive force on the magnets 13. This compression results in a favorable stress in both the magnets 13 and the adhesive holding the sleeve 14 to the magnets 13. With the rotor 13 rotating, there will be compression in the magnets 13 at the outer surface but some of the internal sections may be in tension. This is in contrast to a stainless steel sleeve with a line-to-line fit, which will have about the same thermal expansion as the rotor hub and will move away from the maqnet surface when rotating. This leaves the magnet surface unsupported.

When the rotor hub 12, the sleeve 14 and the magnets 13 are rotating at ambient temperature, the composite sleeve 14 is again advantageous. The stainless steel sleeve rotating at ambient temperature will move outward, away from the surfaces of the magnets, thereby leaving them unsupported. In the case of the composite sleeve 14, under the same rotating ambient temperature condition, the sleeve 14 stays in contact with the magnets 13, due to flexure of the sleeve 14 over the interpolar spaces 15. The sleeve 14, therefore, is still supporting the magnets 13 in contrast to the performance of the stainless steel sleeve.

The condition just described, the rotor 10 rotating and at ambient temperature, gives the least favorable state-of-stress in the bondlines between magnets 13 and rotor hub 12. This is due to the lack of interference between the rotor hub/magnet assembly 9 and the sleeve 14. This situation may be corrected by keeping the rotor hub 12 continually above ambient temperature by heating the rotor hub 12 with current from the motor windings or by heating the rotor hub 12 with a supplementary heater.

The preferred course of action for correcting the lack of interference fit between the rotor hub 12 and sleeve 14 at ambient temperature, however, is to use an assembly method described below. The assembly method includes the wet-winding of high strength filaments directly onto the rotor hub/magnet assembly 9. Once the rotor hub/magnet assembly 9 is wet-wound and cured, the rotor hub/magnet assembly 9 is shrunk, or pressed, onto the shaft 11 with an interference fit. This fit can be designed to provide sufficient sleeve 14 to rotor hub/maqnet assembly 9 interference to keep the magnets 13 and the rotor hub 12 in contact with unbonded magnets at speed. This arrangement also results in a more favorable state of stress in the bondlines between the magnets 13 and the rotor hub 12.

Similar advantages can be obtained when using the fabrication method of winding the sleeve 14 on a mandrel and subsequently fitting the sleeve 14 to the rotor hub/magnet assembly 9. The rotor hub/magnet assembly 9 can be shrunk by cooling it to a temperature below that of the sleeve 14. Once the rotor hub/magnet assembly 9 is shrunk, it can be slid into the sleeve 14. When the rotor hub/magnet assembly 9 returns to room temperature, it expands to provide a beneficial interference. The assembled wound-on-mandrel-sleeve/rotor assembly can also benefit from being interference fitted to the shaft 11 as previously described.

In a prior art motor having a steel sleeve, the lack of compression in the magnets is corrected by placing the sleeve on the rotor with an interference fit. To do this, the slots between the magnets must be filled with epoxy to prevent the sleeve from bending in the interpolar area and thereby eliminating the interference fit. Once the sleeve is interference fit, the rotor is turned to the required diameter on a lathe. The composite sleeve 14 eliminates these steps and also reduces the inertia of the rotor.

One way of obtaining a composite sleeve 14 is to have one fabricated on a mandrel which is separate from the rotor. The composite sleeve 14 cannot be made circular when an epoxy filler is not used in the interpolar areas 15. The reason for this is that upon loading, the sleeve 14 will straighten out to the chords between the corners of magnets 13 which is a low stiffness bending action rather than a high stiffness tension action. This low stiffness of the sleeve 14 could lead to the magnets 13 impacting the stator if the adhesive failed. To eliminate this, the composite sleeve 14 is fabricated with six flats 16 as in FIG. 1. These flats 16 are somewhat shorter than the chords, allowing some bending to take place on the sleeve 14 between the magnets 13. By adjusting the length of the flats, the levels of tensile stress in the sleeve 14 and compressive stress on the magnets 13 may be controlled within a wide range to fit specific design requirements.

Figure 2:
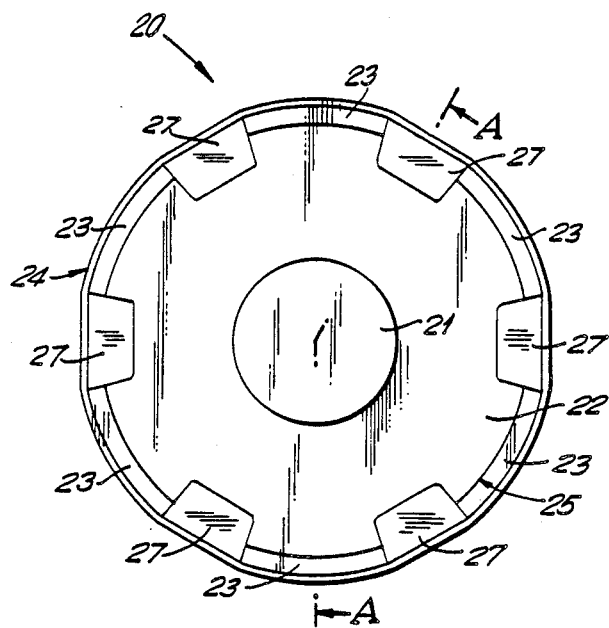
FIG. 2 is a front view of a rotor and composite sleeve with a spacer bar disposed in the interpole spaces.
Figure 3:
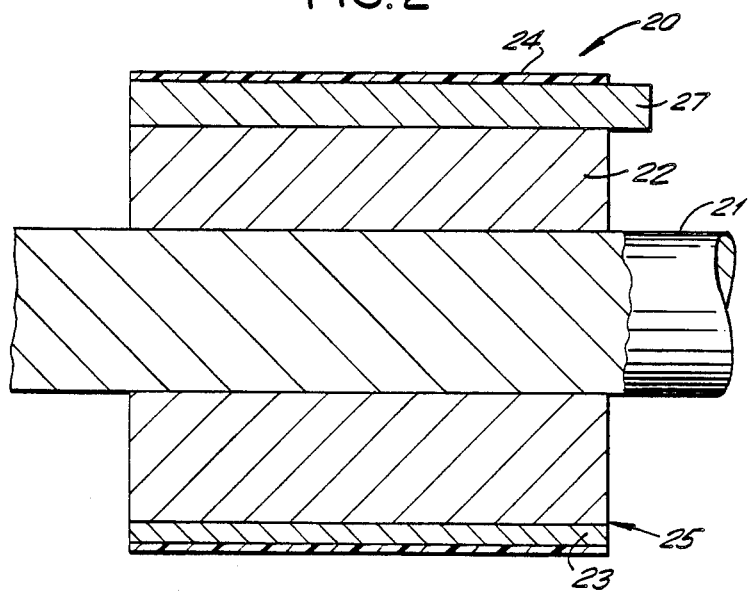
FIG. 3 is a cross sectional taken along line A—A of FIG. 2.

Another method for constructing a rotor 20 with a composite sleeve 24, is shown in FIGS. 2 and 3. This method includes the wet-winding of filaments of the high strength, high modulus fiber directly onto a rotor hub/magnet assembly 25. This method requires a matrix that has a low initial setup temperature (about 150° F.). Such a matrix achieves a high percentage of its final fully cured properties at the initial setup temperature. After the initial setup of the matrix, the rotor hub/magnet assembly 25 and sleeve 24 are taken to the final cure temperature for completion of the cure process. As the rotor hub/magnet assembly 25 heats during final cure of the matrix, it expands. Since the matrix has taken an initial set (and has some stiffness) from the lower temperature cure and since its coefficient of thermal expansion is less than that of the rotor hub/magnet assembly 25, the sleeve 24 is put into tension. After final cure is completed and the rotor hub/magnet assembly 25 cools, the sleeve 24 and rotor hub 22 return to their room temperature fit of some interference to very slightly loose which is more favorable than the large gaps resulting from the alternate process described next. If this low temperature initial setup matrix is not used, upon heating the rotor hub/magnet assembly 25, the wet composite sleeve 24 will stretch with the rotor hub/magnet assembly 25 and then cure at the expanded dimension. Since it did not accumulate stress or strain while expanding, the stretched sleeve 24 will be loose on the rotor hub/magnet assembly 25 upon cooling down. The process of winding of the filament directly on the rotor hub/magnet assembly 25 and the amount of interference of the sleeve 24 to the rotor hub/magnet assembly 25 also benefits from winding the filament with tension.

The assembly of the rotor 22 and sleeve 24 to the shaft 21 with interference may be used to give a favorable state of stress in the sleeve 24, magnet 23, and adhesive. In winding the filament directly onto the rotor hub/magnet assembly, it is advantageous to use a removeable interpolar filler piece 27. This filler piece 27 is placed in the interpolar space during the winding of the wet filament. The filler piece 27 serves to support the filaments during winding and cure, giving the sleeve 24 the desired length of flats and the proper filament density. The filler piece 27 is removed after the composite sleeve 24 has fully cured. The length of the flats can be adjusted to give the desired tensile stress in the sleeve 24 and compressive stress in the magnets 23.

It is clear that all of the above with the exception of the fitting of the rotor hub to the shaft with an interference fit may be applied to a one piece shaft and hub.

While the invention has been described in its preferred embodiments, it is to be understood that the words which have been used are words of description, rather than limitation, and that changes may be made within the purview of the appended claims without departing from the true scope and spirit of the invention in its broader aspects.

I claim:

1. A method for manufacturing a composite sleeve for a hollow rotor hub, having a plurality of magnets bonded thereto, for an electric motor or generator which comprises the steps of:

winding the composite sleeve upon a mandrel having a diameter less than that of the rotor hub;

cooling the hollow rotor hub/magnet assembly until it shrinks to a diameter less than that of the sleeve;

inserting the cooled rotor hub/magnet assembly into the composite sleeve; and pressing the hollow rotor/hub/magnet/sleeve assembly onto the shaft such that both an interference fit between the shaft and the rotor/hub/magnet/sleeve assembly and an interference fit between the composite sleeve and the rotor hub/magnet assembly are achieved.

2. A method of manufacturing a composite sleeve for a hollow rotor hub, having a plurality of magnets bonded thereto, for an electric motor or generator which comprise the steps of:

winding the composite sleeve directly on the rotor hub/magnet assembly at room temperature;

allowing the matrix of the composite sleeve to initially set up at a relatively low temperature above room temperature;

bringing the composite sleeve and the rotor hub/magnet assembly to a cure temperature; and allowing the composite sleeve to return to room temperature and pressing the hollow rotor hub/magnet/sleeve assembly onto the shaft such that both an interference fit between the shaft and the rotor hub/magnet/sleeve assembly and an interference fit between the composite sleeve and the rotor hub/magnet assembly are achieved.

3. A method according to claim 2 which includes the further steps of inserting filler pieces between the magnets prior to winding the composite sleeve and removing the filler pieces after the composite sleeve has returned to room temperature.

* * * * *